United States Patent
Urs et al.

(10) Patent No.: US 6,292,781 B1
(45) Date of Patent: Sep. 18, 2001

(54) METHOD AND APPARATUS FOR FACILITATING DISTRIBUTED SPEECH PROCESSING IN A COMMUNICATION SYSTEM

(75) Inventors: Kamala D. Urs, Bartlett; Valy Lev, Buffalo Grove; Anatoly S. Belkin, Mt. Prospect, all of IL (US); Israel A. Cimet, Chandler, AZ (US)

(73) Assignee: Motorola, Schaumburg, IL (US)

( * ) Notice: Subject to any disclaimer, the term of this patent is extended or adjusted under 35 U.S.C. 154(b) by 0 days.

(21) Appl. No.: 09/322,846

(22) Filed: May 28, 1999

(51) Int. Cl.⁷ .......................... G10L 15/22; H04M 11/06
(52) U.S. Cl. ................. 704/270.1; 379/93.09; 455/553
(58) Field of Search ................ 704/270, 270.1, 704/275, 201; 455/552, 553; 379/93.09, 100.15, 100.16, 202

(56) References Cited

U.S. PATENT DOCUMENTS

| H1880 | * 10/2000 | Vines et al. ........................... 370/310 |
|---|---|---|
| 5,555,260 | * 9/1996 | Rinnback et al. .................... 370/347 |
| 5,916,302 | * 6/1999 | Dunn et al. ........................... 709/204 |
| 5,956,683 | * 9/1999 | Jacobs et al. .......................... 704/275 |
| 5,963,618 | * 10/1999 | Porter ................................ 379/88.17 |
| 5,991,716 | * 11/1999 | Lehtimaki ............................ 704/212 |
| 6,125,284 | * 9/2000 | Moore et al. ......................... 455/557 |
| 6,138,030 | * 10/2000 | Coombes et al. ..................... 455/507 |
| 6,151,501 | * 11/2000 | Belkin et al. ........................ 455/436 |
| 6,157,844 | * 12/2000 | Doran et al. ......................... 455/552 |
| 6,230,120 | * 5/2001 | Suvanen ............................... 704/201 |

* cited by examiner

Primary Examiner—William Korzuch
Assistant Examiner—Martin Lerner
(74) Attorney, Agent, or Firm—Jeffrey K. Jacobs

(57) ABSTRACT

The present invention addresses the need for an apparatus and method for facilitating and performing distributed speech processing in a wireless communication system. The present invention encompasses communication infrastructure embodiments that facilitate distributed speech processing by establishing voice and data pathways to support distributed speech processing services. The present invention also encompasses a communication unit that performs distributed voice recognition and distributed speech synthesis via the communication infrastructure. The communication unit (102) requests communication services from the communication infrastructure (101) that support both voice and data communication and utilizes a data connection to a distributed speech processing unit (116) to perform distributed voice recognition and distributed speech synthesis.

21 Claims, 9 Drawing Sheets

METHOD AND APPARATUS FOR FACILITATING DISTRIBUTED SPEECH PROCESSING IN A COMMUNICATION SYSTEM

CROSS-REFERENCE TO RELATED APPLICATION

This application is related to co-pending applications entitled "METHOD AND APPARATUS FOR PERFORMING DISTRIBUTED SPEECH PROCESSING IN A COMMUNICATION SYSTEM" (Ser. No. 09/322,674) and "METHOD AND APPARATUS FOR PROVIDING SIMULTANEOUS VOICE AND DATA COMMUNICATION IN A COMMUNICATION SYSTEM", (Ser. No. 09/322,563) filed on even date herewith, and assigned to the assignee of the instant application.

FIELD OF THE INVENTION

The present invention relates generally to communication systems and, in particular, to facilitating and performing distributed speech processing in communication systems.

BACKGROUND OF THE INVENTION

Distributed speech processing includes distributed voice recognition and distributed speech synthesis. Distributed voice recognition involves the extraction of speech features by one device and pattern recognition by another device, and distributed speech synthesis involves the generation of speech synthesis data by one device and the speech synthesis by another device. The integration of distributed speech processing technology into wireless communication systems is a relatively new problem requiring solutions that are compatible with existing wireless technology and systems. In a wireless communication system, a communication unit may perform the feature extraction or speech synthesis while infrastructure equipment performs the pattern recognition or speech synthesis data generation. In such a system, a communication path between the communication unit and the appropriate infrastructure equipment is needed to facilitate the distributed speech processing service. The characteristics and capabilities of this communication path determine the extent to which distributed speech processing can be utilized by users of the communication system.

Thus, there is a need for an apparatus and method for facilitating and performing distributed speech processing, in the context of a wireless communication system, that is compatible with existing wireless communication systems and yet provides users flexibility in utilizing distributed speech processing capabilities.

DESCRIPTION OF A PREFERRED EMBODIMENT

Figure 1:
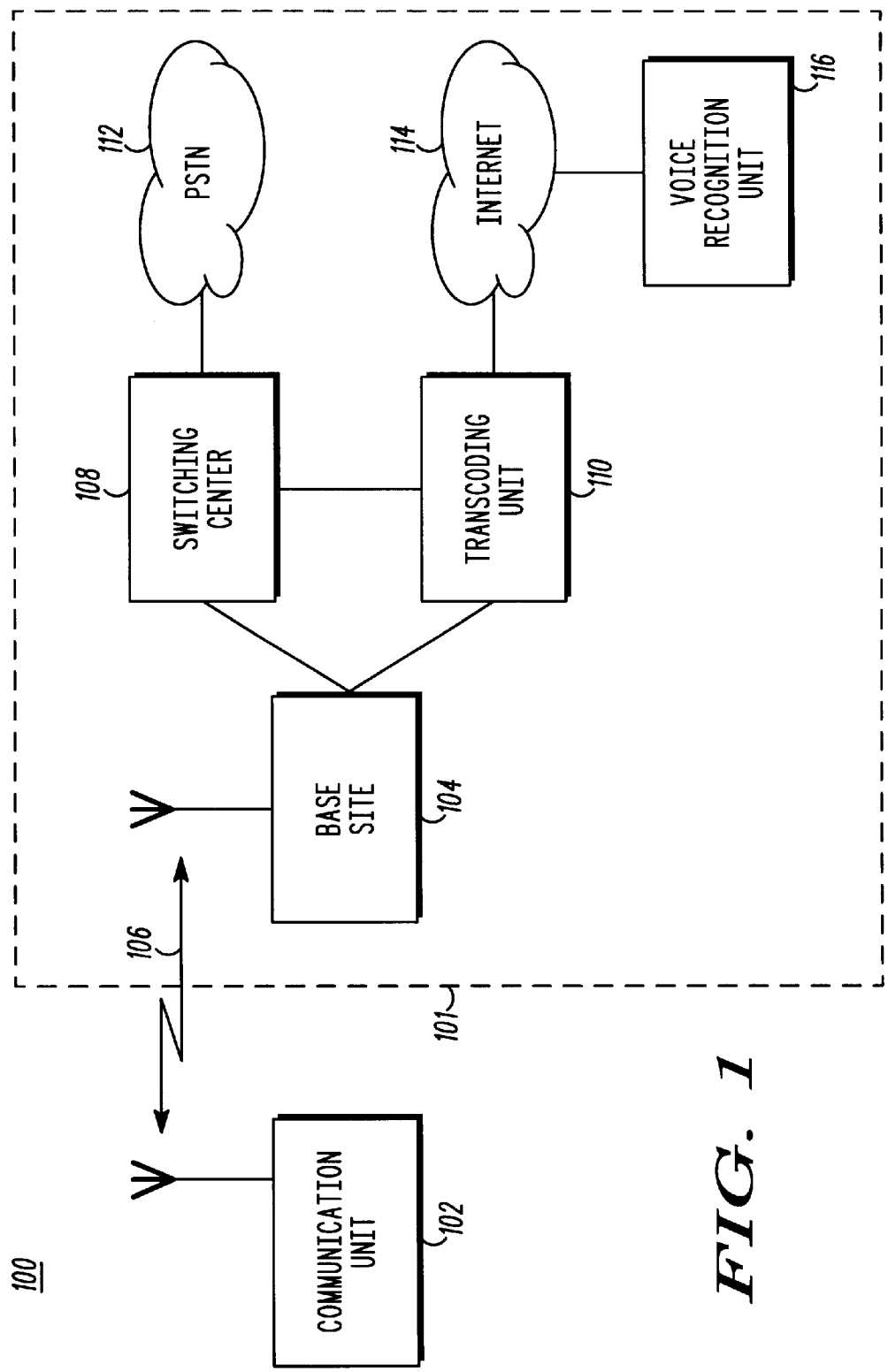
FIG. 1 is a block diagram depiction of a communication system in accordance with a preferred embodiment of the present invention.

The present invention addresses the need for an apparatus and method for facilitating and performing distributed speech processing in a wireless communication system. The present invention encompasses communication infrastructure embodiments that facilitate distributed speech processing by establishing voice and data pathways to support distributed speech processing services. The present invention also encompasses a communication unit that performs distributed voice recognition and distributed speech synthesis via the communication infrastructure. The communication unit requests communication services from the communication infrastructure that support both voice and data communication and utilizes a data connection to a distributed speech processing unit to perform distributed voice recognition and distributed speech synthesis.

The present invention encompasses a first method for a communication infrastructure to facilitate distributed speech processing. The communication infrastructure receives a request from a communication unit for a communication service that supports both voice and data communication and receives a call request for a call between the communication unit and a communication device. The communication infrastructure establishes a voice path between the communication unit and the communication device using a wireless communication resource and establishes a data path between the communication unit and a distributed speech processing unit using the wireless communication resource.

Another embodiment of the present invention encompasses a second method for a communication infrastructure to facilitate distributed speech processing. The communication infrastructure receives a request from a communication unit to call a distributed speech processing unit. The communication infrastructure also receives a request from the communication unit for a communication service that supports alternate voice and data communication. In response, the communication infrastructure establishes a voice path between the communication unit and the distributed speech processing unit using a wireless communication resource and establishes a data path between the communication unit and the distributed speech processing unit using the wireless communication resource.

Additionally, the present invention encompasses a first method for a communication unit to perform distributed speech processing. The communication unit requests a communication service from a communication infrastructure that supports both voice and data communication. The communication unit further requests a voice connection, as provided by the communication service, between the communication unit and a communication device and requests a data connection, as provided by the communication service, between the communication unit and a distributed speech processing unit. The communication unit extracts speech processing data from a voice signal and transmits the speech processing data to the distributed speech processing unit via the data connection.

Another embodiment of the present invention encompasses a second method for a communication unit to perform distributed speech processing. The communication unit requests a communication service from a communication infrastructure that supports both voice and data communication. The communication unit further requests a voice connection, as provided by the communication service, between the communication unit and a communication device and requests a data connection, as provided by the communication service, between the communication unit and a distributed speech processing unit. The communication unit receives speech synthesis data from the distributed speech processing unit via the data connection and synthesizes the speech synthesis data into a voice signal.

Another embodiment of the present invention encompasses a first communication unit apparatus. The communication unit comprises a transmitter and a processor, coupled to the transmitter, that instructs the transmitter to transmit to a communication infrastructure a request for a communication service that supports both voice and data communication, a request for a voice connection, as provided by the communication service, between the communication unit and a communication device, and a request for a data connection, as provided by the communication service, between the communication unit and a distributed speech processing unit. The communication unit also comprises a receiver, coupled to the processor, that receives speech synthesis data from the distributed speech processing unit via the data connection and provides the processor with the speech processing data for speech synthesis.

Finally, the present invention encompasses a second communication unit apparatus. The second communication unit apparatus comprises a transmitter and a processor, coupled to the transmitter, that instructs the transmitter to transmit to a communication infrastructure a request for a communication service that supports both voice and data communication, a request for a voice connection, as provided by the communication service, between the communication unit and a communication device, and a request for a data connection, as provided by the communication service, between the communication unit and a distributed speech processing unit. The processor further instructs the transmitter to transmit, to the distributed speech processing unit via the data connection, speech processing data extracted from a voice signal.

The present invention can be more fully understood with reference to FIGS. 1–9. FIG. 1 is a block diagram depiction of a communication system 100 in accordance with a preferred embodiment of the present invention. The preferable communication system 100 comprises a communication infrastructure 101 and communication unit 102. The communication infrastructure 101 comprises a base site 104, a switching center 108, a transcoding unit 110, a public switched telephone network (PSTN) 112, the Internet 114, and a distributed speech processing unit 116. In the preferred embodiment, the communication system 100 comprises an "iDEN" communication system that is commercially available from Motorola, Inc. of Schaumburg, Ill. Accordingly, the communication unit 102 preferably comprises an "iDEN" radiotelephone, and the communication infrastructure 101 comprises infrastructure equipment, preferably "iDEN" infrastructure equipment, such as an "iDEN" Enhanced Base Transceiver System (EBTS) for base site 104, an "iDEN" Enhanced Transcoder (EXCDR) and an "iDEN" Interworking Function (IWF) for transcoding unit 110, and an "iDEN" Mobile Switching Center (MSC) for switching center 108. The distributed speech processing unit 116 preferably comprises a computer telephony platform comprising conventional circuitry operated and controlled by routinely developed software, such as the circuitry and software used in central processing units and network interface cards (NICs). The computer telephony platform performs distributed speech processing by employing known distributed speech processing algorithms such as those currently under consideration by the European Telecommunications Standards Institute (ETSI). The PSTN 112 and the Internet 114 are known public access networks.

Operation of a preferred communication system 100 in accordance with the present invention, occurs substantially as follows. The base site 104 receives a request from the communication unit 102 via a wireless interface 106 for a communication service that supports both voice and data communication. Preferably, the request is for a Global System for Mobile communications (GSM) alternate speech and data service combined with a direct connect service. The GSM alternate speech and data service supports voice and data communication alternately, and the direct connect service supports a data connection to the distributed speech processing unit 116 via transcoding unit 110.

The communication service request preferably indicates whether voice or data is requested as the first mode. If, for example, data is requested as the first mode, the communication infrastructure 101 establishes a data path between the communication unit 102 and the distributed speech processing unit 116 using a wireless communication resource of the wireless interface 106. In the preferred embodiment, the data path between the communication unit 102 and the distributed speech processing unit 116 is established via a data communication network such as the Internet 114. Also in the preferred embodiment, the switching center 108, in response to the communication service request, routes data communication between the communication unit 102 and the distributed speech processing unit 116 via a data transcoder logically included in the transcoding unit 110. The data transcoder preferably comprises an "iDEN" IWF that converts between "iDEN" data and 64 kbps pulse code modulation (PCM) data. Thus, the distributed speech processing unit 116 is able to receive speech processing data from the communication unit 102 via the data path.

The communication infrastructure 101 further receives a call request associated with communication service request for a call between the communication unit 102 and a communication device (not shown). Preferably, the communication device is connected to the PSTN 112 and comprises a device such as a telephone or a voice mail server. The communication infrastructure 101 establishes a voice path between the communication unit 102 and the communication device using the wireless communication resource. In the preferred embodiment, the voice path between the communication unit 102 and the communication device is established via a telephone network such as the PSTN 112. Also in the preferred embodiment, the switching center 108, in response to the call request, routes voice communication between the communication unit 102 and the communication device via a voice transcoder logically included in the transcoding unit 110. The voice transcoder preferably comprises an "iDEN" EXCDR that converts between Vector Sum Excited Linear Predicting (VSELP) voice and PCM voice. Thus, the communication device is able to receive voice communication from the communication unit 102 via the voice path.

Either voice or data may be requested as the first mode. If voice is requested as the first mode, the voice path is preferably established as described above. The data path is then preferably established, as described above, in response to the receipt of a data path request associated with the communication service request. Thus, a request for a second mode of the alternate speech and data, direct connect service may be received by the communication infrastructure at any time.

The voice path and the data path use the wireless communication resource alternately. In the preferred embodiment, the switching center 108 receives an indication to switch between the data path and the voice path. Preferably, the indication to switch comprises a call hold request from the communication unit 102. In response, the switching center 108 switches between the data path and the voice path. For example, if the voice path is currently being used for voice communication between the communication unit 102 and the communication device, a user of the communication unit may "put the call on hold" and thereby send an indication to switch from the voice path to the data path.

Figure 2:
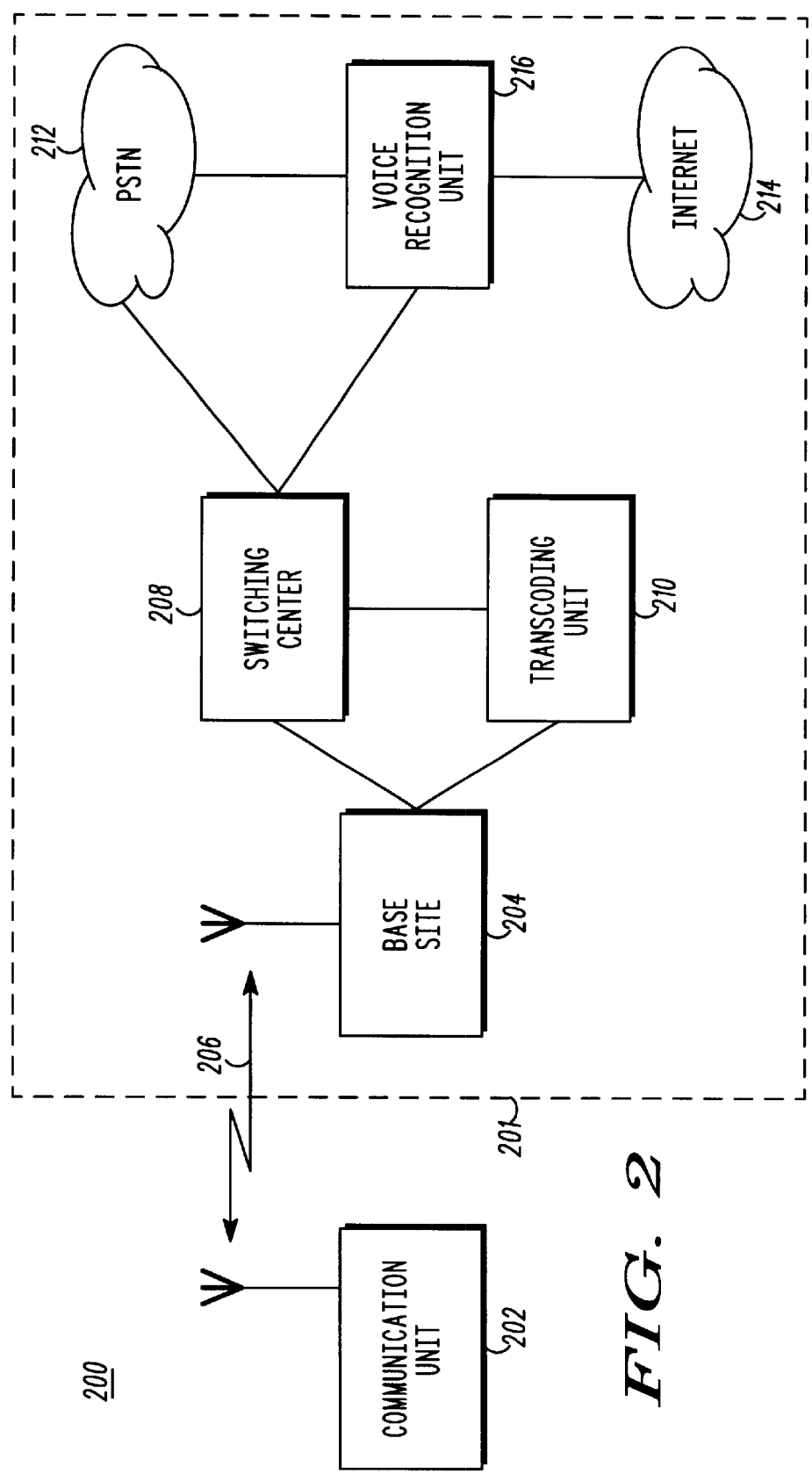
FIG. 2 is a block diagram depiction of a communication system in accordance with a first alternate embodiment of the present invention.

FIG. 2 is a block diagram depiction of a communication system 200 in accordance with a first alternate embodiment of the present invention. The alternate communication system 200 comprises a communication infrastructure 201 and a communication unit 202. The alternate communication system 200 is similar to the preferred communication system 100 as follows. The communication infrastructure 201 comprises a base site 204, a switching center 208, a transcoding unit 210, a public switched telephone network (PSTN) 212, the Internet 214, and a distributed speech processing unit 216. The communication system 200 comprises an "iDEN" communication system. Accordingly, the communication unit 202 comprises an "iDEN" radiotelephone, and the communication infrastructure 201 comprises "iDEN" infrastructure components such as an "iDEN" EBTS for base site 204, an "iDEN" EXCDR and an "iDEN" IWF for transcoding unit 210, and an "iDEN" MSC for switching center 208. The distributed speech processing unit 216 comprises a distributed speech processing unit as described above with regard to the distributed speech processing unit 116. The PSTN 112 and the Internet 114 are known public access networks.

The alternate communication system 200 differs from the preferred communication system 100 in the manner in which the distributed speech processing unit 216 interfaces with other components of the communication infrastructure 201. The distributed speech processing unit 216 is coupled to the switching center 208 via an interface capable of supporting voice and data communication. The distributed speech processing unit 216 is also coupled to both the PSTN 212 and the Internet 214 via an interface capable of supporting voice communication and an interface capable of supporting data communication, respectively.

Operation of an alternate communication system 200 in accordance with the present invention occurs substantially as follows. The base site 204 receives from the communication unit 202, via a wireless interface 206, a request for a GSM alternate speech and data service and a request to call the distributed speech processing unit 216. In response to this service request and this call request, the communication infrastructure 201 establishes a data path between the communication unit 202 and a distributed speech processing unit 216 using a wireless communication resource of the wireless interface 206. The switching center 208, in fact, routes data communication between the communication unit 202 and the distributed speech processing unit 216 via a data transcoder logically included in the transcoding unit 210. Thus, the distributed speech processing unit 216 is able to receive speech processing data from the communication unit 202 via the data path.

In response to the service request and the call request, the communication infrastructure 201 further establishes a voice path between the communication unit 202 and the distributed speech processing unit 216 using the wireless communication resource. A switching center 208 routes voice communication between the communication unit 202 and the distributed speech processing unit 216 via a voice transcoder logically included in the transcoding unit 210. Thus, the distributed speech processing unit 216 is able to receive voice communication from the communication unit 202 via the voice path.

Therefore, the distributed speech processing unit 216 receives both voice communication and data communication from the communication unit 202. The data communication comprises speech processing data that the distributed speech processing unit 216 further processes for the purpose of performing voice recognition. Since the voice path and the data path are conveyed via the same physical link to the distributed speech processing unit 216, the distributed speech processing unit 216 must differentiate between received voice communication and received data communication by known signal processing techniques or by recognizing indicators inserted by other infrastructure equipment included in the voice or data paths. Connectivity with the Internet 214 allows the distributed speech processing unit 216 to retrieve information, for example, in response to interpreted voice commands. Connectivity with the PSTN 212 allows voice communication to be established between the communication unit 202 and a communication device connected to the PSTN 212 via the distributed speech processing unit 216.

The voice path and the data path use the wireless communication resource alternately and switching between the voice path and the data path occurs substantially the same as in the preferred embodiment. The switching center 208 receives an indication to switch between the data path and the voice path from the communication unit 202. In response, the switching center 108 switches between the data path and the voice path.

As in the preferred embodiment, either voice or data may be requested as the first mode. Unlike the preferred embodiment, however, the voice path and the data path both connect the communication unit 202 with the distributed speech processing unit 216. The GSM alternate speech and data service, in general, provides a client both voice and data communication but only with a single destination client. Thus, the preferred embodiment requires an additional service, the direct connect service, in combination with the GSM alternate speech and data service to allow a communication unit to alternately exchange voice communication with a first destination client, a communication device, and data communication with a second destination client, a distributed speech processing unit. The alternate communication system 200, in contrast, does not require any additional service to be combined with the GSM alternate speech and data service.

Figure 3:
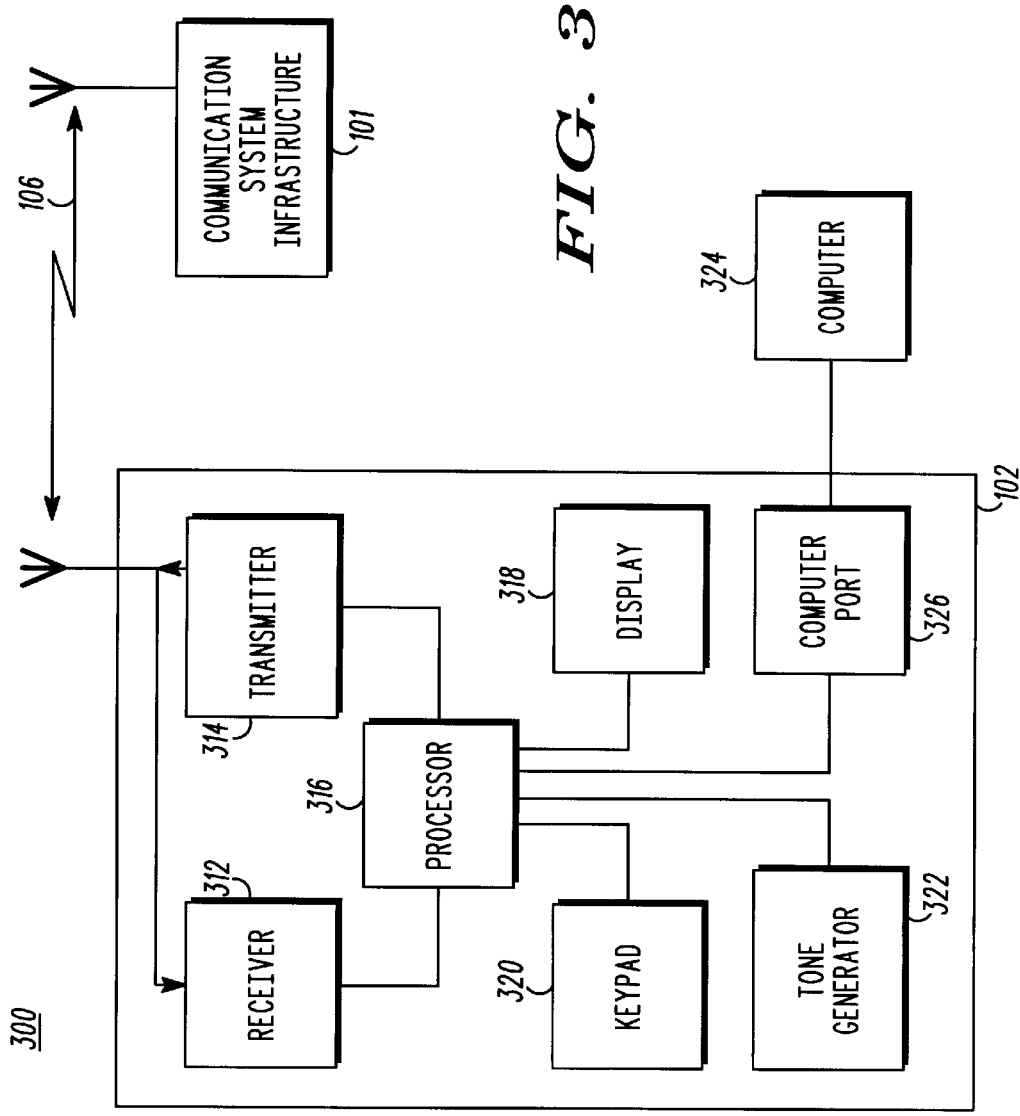
FIG. 3 is a block diagram depiction of a communication system in accordance with the present invention.

FIG. 3 is a block diagram depiction of a communication system 300 in accordance with the present invention. The preferred communication system 300 comprises the communication unit 102, the communication infrastructure 101, and a computer 324. The communication infrastructure 101 comprises a distributed speech processing unit with Internet connectivity as described above. The communication unit 102 comprises a processor 316 that preferably comprises a known microprocessor and memory. Coupled to the processor 316 are a receiver 312, a transmitter 314, a keypad 320, a display 318, a tone generator 322, and a computer port 326. The receiver 312, the transmitter 314, the keypad 320, the display 318, the tone generator 322, and the computer port 326 are each known components of wireless phones that comprise conventional circuitry operated and controlled by routinely developed software and/or firmware. The computer 324 preferably comprises a laptop computer but may be any computing device capable of interfacing with the communication unit 102 via the computer port 326.

Operation of the preferred communication system 300 in accordance with the present invention occurs substantially as follows. The processor 316 instructs the transmitter 314 to transmit to the communication infrastructure 101 a request for a communication service that supports both voice and data communication, a request for a voice connection, as provided by the communication service, between the communication unit 102 and a communication device, and a request for a data connection, as provided by the communication service, between the communication unit 102 and the distributed speech processing unit.

The communication service requested provides both a voice connection and a data connection for use by the communication unit 102. Because only one of the connections may be utilized at a time in the preferred embodiment, switching between the voice connection and the data connection requires an indication to be transmitted to the communication infrastructure. A user of the communication unit may preferably trigger such an indication by pressing a button or a key on the communication unit 102 or by speaking a designated word or phase that is recognized by the communication unit 102.

Preferably after switching to the data connection with the distributed speech processing unit, the processor 316 further instructs the transmitter to transmit to the distributed speech processing unit, via the data connection, speech processing data extracted from a voice signal. In the preferred embodiment, the voice signal is generated from the speech of a user of the communication unit 102. The processor 316 then preferably performs feature extraction of the speech conveyed by the voice signal in accordance with known voice recognition techniques.

When the user speech comprises a voice command that requests information, the distributed speech processing unit preferably interprets the request and retrieves the corresponding information. Information such as stock market related information, weather related information, navigational information, news related information, sports related information, traffic related information, or directory related information may be requested, for example. The distributed speech processing unit may retrieve such information via the Internet or internal databases. Once retrieved, the information is transmitted to the communication unit 102 via the data connection.

Instead, when the user speech comprises a voice command that contains a communication service related request, the distributed speech processing unit preferably interprets the request and generates one or more GSM direct transfer application part (DTAP) messages that correspond to the communication service requested. Communication service related requests such as a request to call a given number, a request to call a given person, a request to establish a call forwarding number, a request to put a call on hold, a request to retrieve a call, a request to transfer a call, and a request to invoke a three-way conference call may be included in the voice command, for example. The GSM DTAP messages are then transmitted to the communication unit 102 via the data connection.

The receiver 312 receives information from the distributed speech processing unit via the data connection. When one or more communication service request messages, i.e. GSM DTAP messages, for the communication infrastructure are received, the processor 316 instructs the transmitter 314 to transmit the communication service request messages to the communication infrastructure 101. Thus, the communication unit 102 requests the communication service from the communication infrastructure using communication service request messages generated by the distributed speech processing unit.

In the preferred embodiment, information received from the distributed speech processing unit via the data connection may indicate a destination for the information to be piped upon receipt. Such destinations preferably include the communication unit display 318, the communication unit computer port 326, the communication unit tone generator 322, and the communication unit transmitter 314. The voice command that requests the information preferably indicates the destination for the information to be piped upon receipt by the communication unit. When the destination is the display 318, the processor 316 pipes the information received from the distributed speech processing unit to the display 318. When the destination is the tone generator 322, the processor 316 pipes the information received from the distributed speech processing unit to the tone generator 322. And when the destination is the computer port 326, the processor 316 pipes the information received from the distributed speech processing unit to the computer port 326.

In the preferred embodiment, information is also transmitted to the distributed speech processing unit for synthesis into speech. Keypress information from the keypad 320 is transmitted to the distributed speech processing unit via the data connection by the transmitter 314 when instructed to do so by the processor 316. Such keypress information preferably comprises text keyed by a user of the communication unit 102. The transmitter 314 transmits display information from display 318 to the distributed speech processing unit via the data connection, when instructed to do so by the processor 316. Preferably, display information comprises text viewed via display 318 and selected by a user of the communication unit 102. The user may thus select an email or a short message service message for synthesis into speech. The transmitter 314 transmits information received by the computer port to the distributed speech processing unit via the data connection, when instructed to do so by the processor 316. Preferably, textual information from computer 324 may thus be synthesized into speech. The transmitter 314 also transmits communication service related information to the distributed speech processing unit via the data connection, when instructed to do so by the processor 316. The communication service related information preferably comprises GSM DTAP messaging.

Upon receiving information for synthesis into speech via the data connection, the distributed speech processing unit preferably generates speech feature information. The speech feature information is then sent to the communication unit 102 and converted into audible speech, all by known distributed speech synthesis techniques. Thus, speech synthesis of textual information and communication service related information is performed in the preferred embodiment of the present invention.

The present invention provides a user of a wireless communication system many ergonomic enhancements and capabilities. The use of voice recognition technology simplifies the user-to-communication unit interface. It allows "hands free" operation of a communication unit while driving, for example. The use of distributed voice recognition technology in wireless communication systems enhances voice recognition by extracting speech features before speech is degraded by transmission over a wireless interface.

The present invention, in addition, provides the user the ability to obtain information simply by speaking into the communication unit and asking. The user can, for example, ask for the latest news headlines or stock prices and specify that the information be sent to the communication unit display. The user, involved in a telephone call, can place the call on hold, ask for the weekend weather forecast, obtain the forecast, and return to the telephone call. The user can speak a designated word or phrase to obtain a connection to the distributed speech processing unit and ask that an urgent email message be synthesized into speech so that she can listen to it, rather than reading it, while driving. Or the user, involved in a telephone call while driving, can speak a designated word or phrase to obtain a connection to the distributed speech processing unit, ask to initiate a three-way call between the call in progress and another person whose telephone number is not known, and continue to drive, without touching the communication unit, while the three-way call is established.

The present invention provides such flexibility to a user by establishing voice and data paths that connect a communication device to both a distributed speech processing unit and other communication devices simultaneously and switching between paths when indicated or appropriate. Such flexibility is also provided by disclosing a communication unit that performs the speech feature extraction, the speech synthesis, the piping of distributed speech processing unit information appropriately, and the recognition of the designated word or phase used to request a connection to a distributed speech processing unit. Finally, the present invention provides embodiments that build upon existing GSM services and equipment. Thus, it is shown that distributed speech processing capabilities can be realized by a wireless communication system compatible with existing wireless communication systems.

Figure 4:
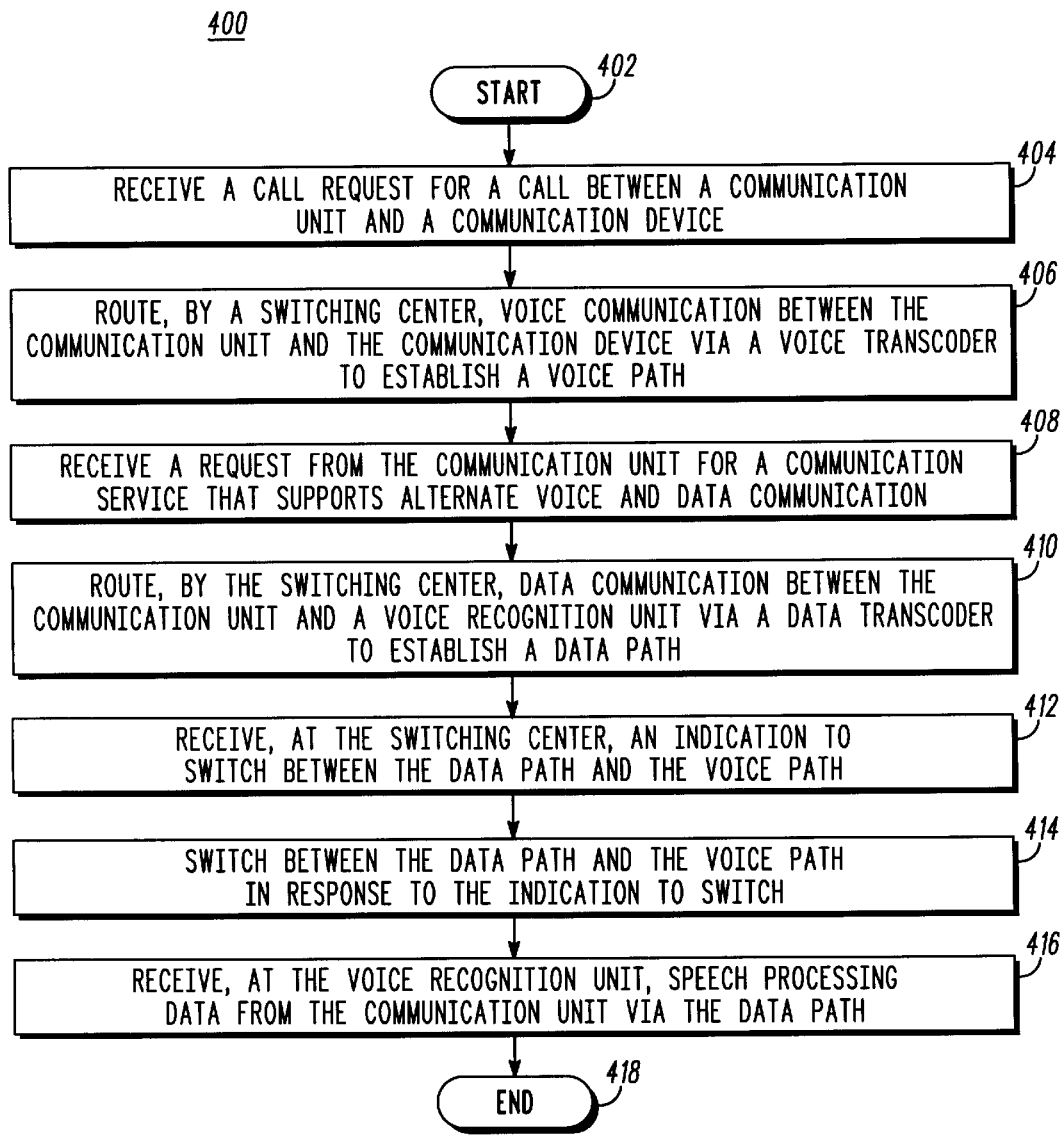
FIG. 4 is a logic flow diagram of steps executed by a communication infrastructure to facilitate distributed speech processing in accordance with a preferred embodiment of the present invention.

FIG. 4 is a logic flow diagram 400 of steps executed by a communication infrastructure to facilitate distributed speech processing in accordance with a preferred embodiment of the present invention. The logic flow begins (402) when the communication infrastructure receives (404) a call request for a call between a communication unit and a communication device. The communication device is preferably connected to a PSTN and comprises a device such as a telephone or a voice mail server. A voice path between the communication unit and the communication device is established by a switching center within the communication infrastructure that routes (406) voice communication via a voice transcoder.

In the preferred embodiment, the communication infrastructure then receives (408) a request from the communication unit for a communication service that supports alternate voice and data communication. In the preferred embodiment, this alternate voice and data communication service request may also be received before or with the call request giving a user of the communication unit added flexibility, i.e., flexibility not currently supported by GSM communication services. A data path between the communication unit and a distributed speech processing unit is established by the switching center that routes (410) data communication via a data transcoder. The distributed speech processing unit may be a distributed speech processing unit selected by default, as when only one such unit is available, or alternatively, a request indicating a particular distributed speech processing unit for connection may be received by the communication infrastructure.

Preferably, the switching center will switch (414) between the data path and the voice path in response to receiving (412) an indication to switch from the communication unit. When the data path is thus selected, the distributed speech processing unit is able to receive (416) speech processing data from the communication unit via the data path. The preferred logic flow as performed by the communication infrastructure to facilitate distributed speech processing thus ends (418).

Figure 5:
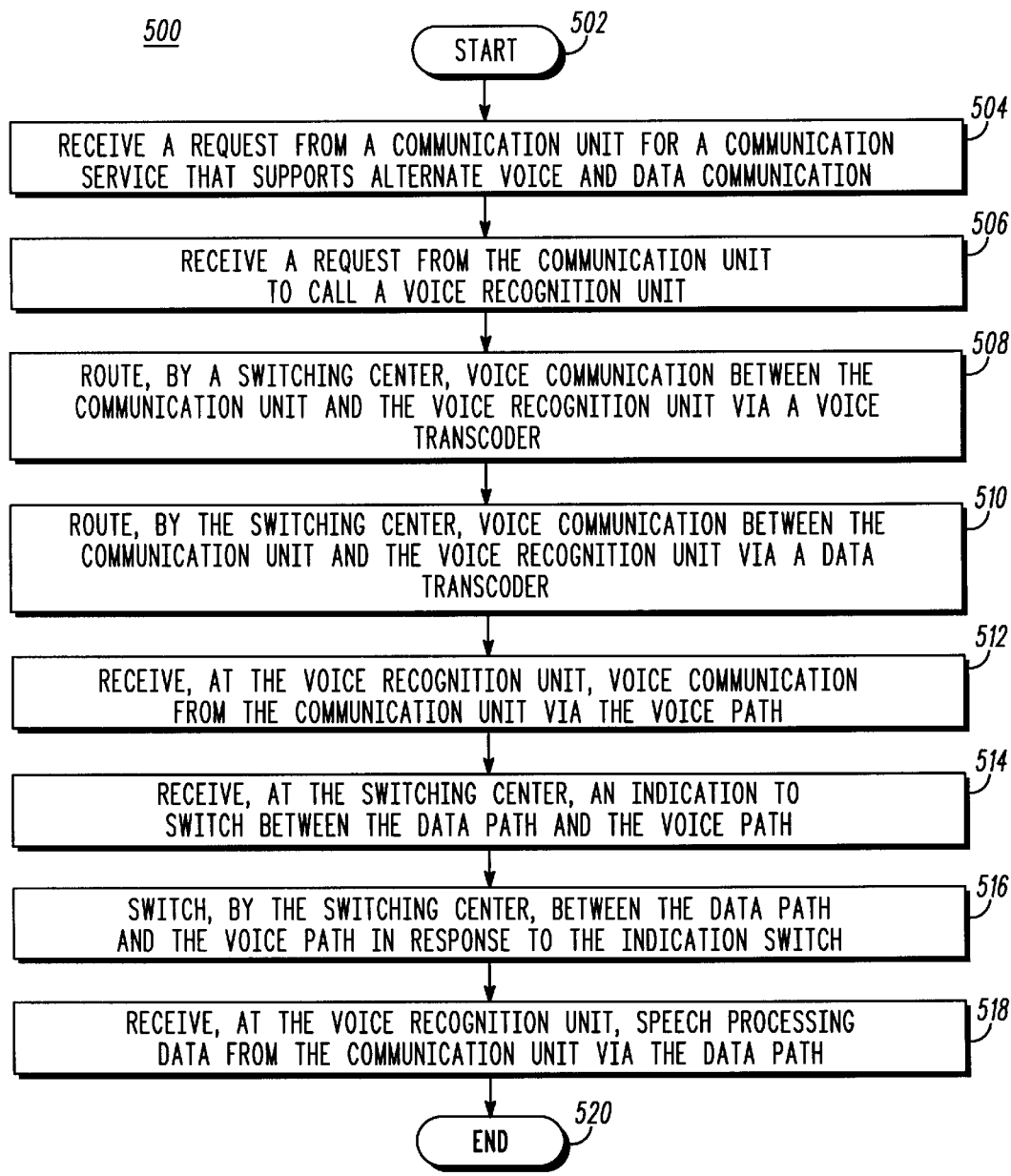
FIG. 5 is a logic flow diagram of steps executed by a communication infrastructure to facilitate distributed speech processing in accordance with a first alternate embodiment of the present invention.

FIG. 5 is a logic flow diagram 500 of steps executed by a communication infrastructure to facilitate distributed speech processing in accordance with a first alternate embodiment of the present invention. The logic flow begins (502) when the communication infrastructure receives (504) a request from the communication unit for a communication service that supports alternate voice and data communication, specifically the GSM alternate speech and data service. The communication infrastructure also receives (506) a request from the communication unit to call a distributed speech processing unit. To establish a voice path, a switching center routes (508) voice communication between the communication unit and the distributed speech processing unit via a wireless communication resource and a voice transcoder. To establish a data path, the switching center routes (510) data communication between the communication unit and the distributed speech processing unit via the wireless communication resource and a data transcoder.

Assuming the voice path is currently being utilized, the distributed speech processing unit receives (512) voice communication from the communication unit via the voice path. The switching center will switch (516) from the voice path to the data path in response to receiving (514) an indication to switch from the communication unit. The switching center toggles between the voice path and data path in response to receiving each indication to switch. When the data path is thus selected, the distributed speech processing unit is able to receive (518) speech processing data from the communication unit via the data path. The first alternate logic flow, performed by the communication infrastructure to facilitate distributed speech processing, ends (520).

Figure 6:
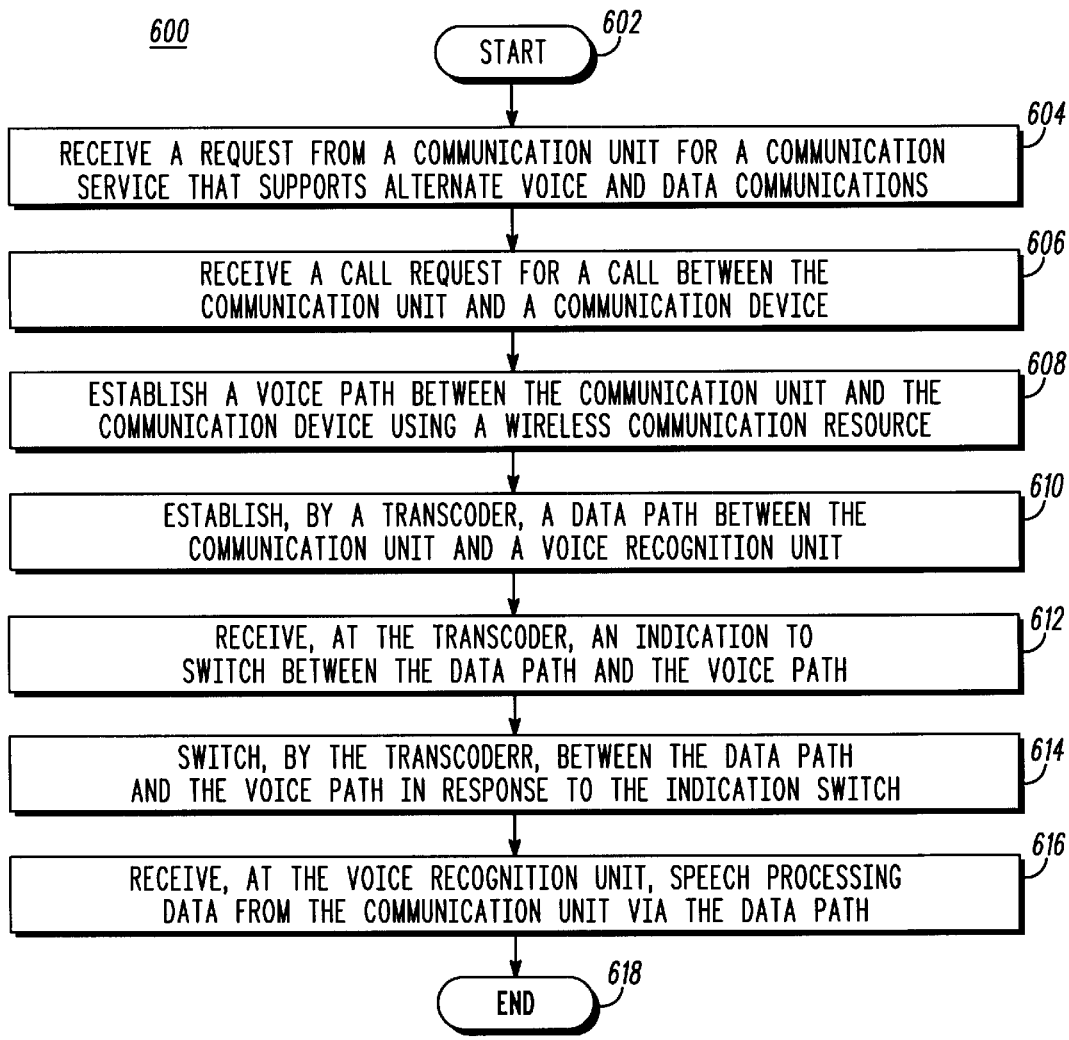
FIG. 6 is a logic flow diagram of steps executed by a communication infrastructure to facilitate distributed speech processing in accordance with a second alternate embodiment of the present invention.

FIG. 6 is a logic flow diagram 600 of steps executed by a communication infrastructure to facilitate distributed speech processing in accordance with a second alternate embodiment of the present invention. The logic flow begins (602) when the communication infrastructure receives (604) a request from a communication unit for a communication service that supports alternate voice and data communication. The communication infrastructure also receives (606) a call request for a call between the communication unit and a communication device.

In response to the call request, the communication infrastructure establishes (608) a voice path between the communication unit and the communication device using a wireless communication resource. Further, a transcoder in the communication infrastructure establishes (610) a data path between the communication unit and a distributed speech processing unit using the wireless communication resource.

The transcoder will switch (614) between the data path and the voice path in response to receiving (612) an indication to switch from the communication unit. When the data path is thus selected, the distributed speech processing unit is able to receive (616) speech processing data from the communication unit via the data path. The second alternate logic flow, performed by the communication infrastructure to facilitate distributed speech processing, ends (618).

In contrast to the previously discussed embodiments of the present invention, the transcoder, rather than the switching center, substantially provides the alternate voice and data service to the communication unit. The transcoder comprises both a voice transcoding unit and a data transcoding unit, and performs the routing of voice communication through the voice transcoding unit, i.e. the voice path, and data communication through the data transcoding unit, i.e. the data path. Using the transcoder to provide the alternate voice and data service to the communication unit allows a wireless communication system to use a switching center that does not support such a specialized or non-standard communication service.

Figure 7:
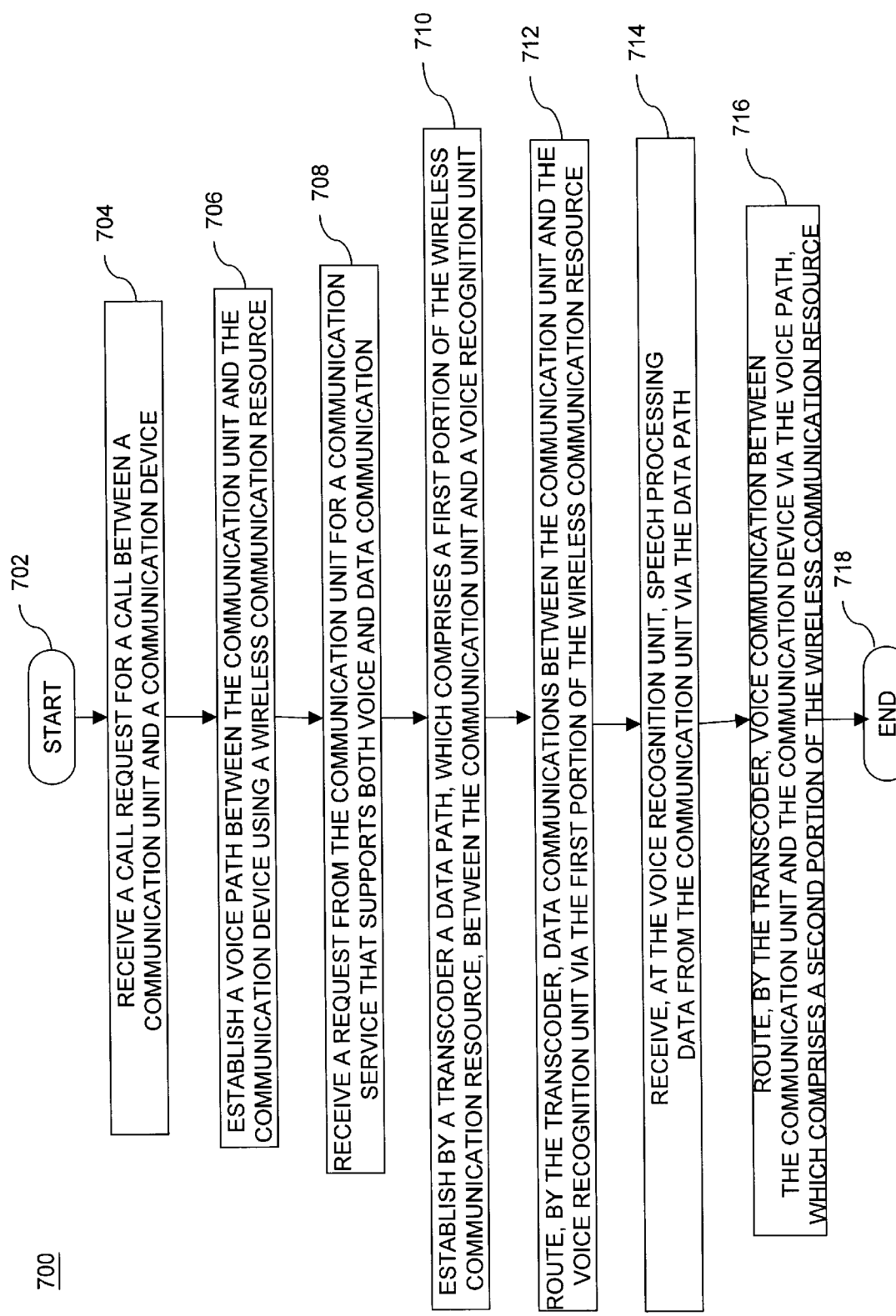
FIG. 7 is a logic flow diagram of steps executed by a communication infrastructure to facilitate distributed speech processing in accordance with a third alternate embodiment of the present invention.

FIG. 7 is a logic flow diagram 700 of steps executed by a communication infrastructure to facilitate distributed speech processing in accordance with a third alternate embodiment of the present invention. The logic flow begins (702) when the communication infrastructure receives (704) a call request for a call between the communication unit and a communication device. In response to the call request, the communication infrastructure establishes (706) a voice path between the communication unit and the communication device using a wireless communication resource.

The communication infrastructure then receives (708) a request from the communication unit for a communication service that supports both voice and data communication. In response, a transcoder in the communication infrastructure establishes (710) a data path between the communication unit and a distributed speech processing unit using a first portion of the wireless communication resource. The transcoder routes (712) data communication between the communication unit and the distributed speech processing unit via the first portion of the wireless communication resource. Thus, the distributed speech processing unit is able to receive (714) speech processing data from the communication unit via the data path.

The transcoder also routes (716) voice communication between the communication unit and the communication device via a second portion of the wireless communication resource. Thus, the transcoder upon receiving a request from the communication unit for a communication service that supports both voice and data communication, splits the wireless communication resource into two portions, the first portion for the data path and the second portion for the voice path. Where the wireless communication resource comprises two time division multiplexed (TDM) time slots, a first time slot and a second time slot, the first portion of the wireless communication resource may comprise the first time slot and the second portion may comprise the second time slot, for example. The third alternate logic flow, performed by the communication infrastructure to facilitate distributed speech processing, ends (718).

In the third alternate embodiment as described above, the voice path and data path can be simultaneously utilized by the communication unit, since the wireless communication resource is shared. Sharing, however, reduces the capacity of the wireless communication resource and may result in degraded voice quality for voice communication carried via the voice path. Thus, as in previous embodiments, the transcoder, upon receiving an indication to switch, will switch between simultaneous voice and data mode to a voice only mode. In the voice only mode, the data path is not available and no longer uses a portion of the wireless communication resource. Therefore, the degradation of voice quality is reversed.

Figure 8:
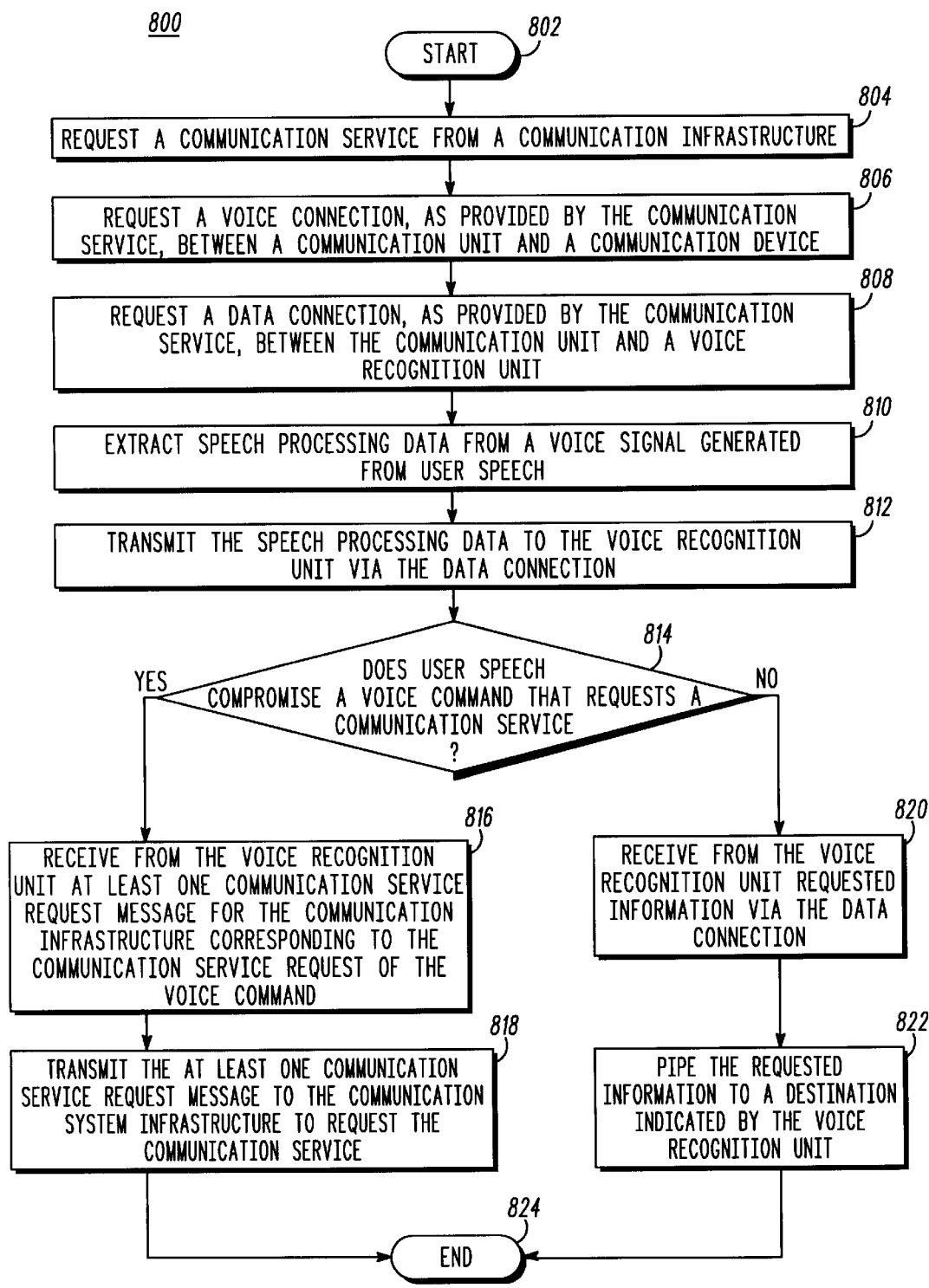
FIG. 8 is a logic flow diagram of steps executed by a communication unit to perform distributed speech processing in accordance with a preferred embodiment of the present invention.

FIG. 8 is a logic flow diagram 800 of steps executed by a communication unit to perform distributed speech processing in accordance with a preferred embodiment of the present invention. The logic flow begins (802) when the communication unit requests a communication service from a communication infrastructure that supports both voice and data communication. The communication unit further requests (806) a voice connection, as provided by the communication service, between the communication unit and a communication device and requests (808) a data connection, as provided by the communication service, between the communication unit and a distributed speech processing unit. Preferably, a voice signal is generated from the speech of a user of the communication unit, and the communication unit extracts (810) speech processing data from the voice signal. The communication unit then transmits (812) the speech processing data to the distributed speech processing unit via the data connection.

Preferably, the user speech may comprise a voice command, explicit or implicit, that contains a communication service related request or a voice command, explicit or implicit, that requests information. When (814) the user speech comprises a voice command that contains a communication service related request, the communication unit preferably receives (816) from the distributed speech processing unit, via the data connection, one or more communication service request messages for the communication infrastructure, corresponding to the communication service related request of the voice command. In the preferred embodiment, the communication service request messages comprise GSM DTAP messages. The communication unit then transmits (818) the one or more communication service request messages to the communication infrastructure to request the communication service, and the logic flow ends (824).

When (814) the voice command instead requests information, the communication unit receives (820) from the distributed speech processing unit requested information via the data connection. In the preferred embodiment, the voice command that requests information indicates a destination for the information to be piped upon receipt by the communication unit, and the requested information received from the distributed speech processing unit indicates the destination accordingly. The communication unit then pipes (822) the requested information to the destination indicated by the distributed speech processing unit. In the preferred embodiment, the destination indicated by the distributed speech processing unit may comprise a destination such as a communication unit display, a communication unit computer port, a communication unit tone generator, or a communication unit transmitter. The preferred logic flow, performed by the communication unit to perform distributed speech processing, thus ends (824).

Figure 9:
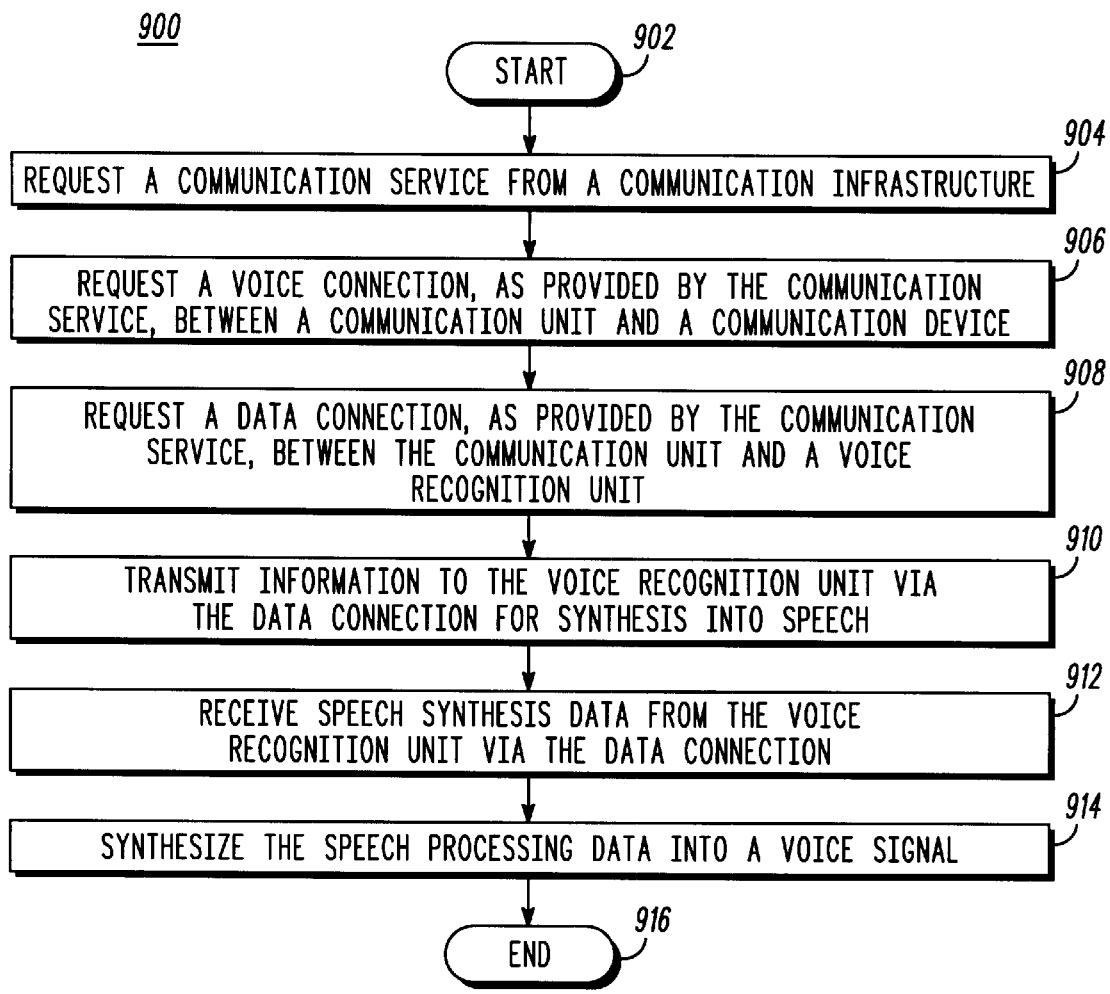
FIG. 9 is a logic flow diagram of steps executed by a communication unit to perform distributed speech processing in accordance with a preferred embodiment of the present invention.

FIG. 9 is a logic flow diagram 900 of steps executed by a communication unit to perform distributed speech processing in accordance with a preferred embodiment of the present invention. The logic flow begins (902) when the communication unit requests (904) a communication service from a communication infrastructure that supports both voice and data communication. The communication unit further requests (906) a voice connection, as provided by the communication service, between the communication unit and a communication device and requests (908) a data connection, as provided by the communication service, between the communication unit and a distributed speech processing unit.

After obtaining the data connection, the communication unit transmits information to the distributed speech processing unit via the data connection, preferably information to be synthesized into speech. In the preferred embodiment, the information transmitted to the distributed speech processing unit may comprise information such as caller ID information, a short message service message, an email message, a battery level indication, or a GSM DTAP message. Also in the preferred embodiment, the source of the information may comprise a communication unit computer port, a communication unit keypad, or a communication unit display. The communication unit then receives (912) speech synthesis data from the distributed speech processing unit via the data connection, preferably corresponding to the information transmitted. Finally, the communication unit synthesizes (914) the speech processing data into a voice signal and preferably generates audible speech for a user of the communication unit. The preferred logic flow, performed by the communication unit to perform distributed speech processing, thus ends (916).

The descriptions of the invention, the specific details, and the drawings mentioned above, are not meant to limit the scope of the present invention. It is the intent of the inventors that various modifications can be made to the present invention without varying from the spirit and scope of the invention, and it is intended that all such modifications come within the scope of the following claims and their equivalents.

What is claimed is:

1. A method for a communication infrastructure to facilitate distributed speech processing, the method comprising the steps of:

receiving a request from a communication unit for a communication service that supports both voice and data communication;

receiving a call request for a call between the communication unit and a communication device;

establishing a voice path between the communication unit and the communication device using a wireless communication resource; and establishing a data path between the communication unit and a distributed speech processing unit using the wireless communication resource, wherein the step of establishing the voice path between the communication unit and the communication device further comprises the step of routing, by a switching center, voice communication between the communication unit and the communication device via a voice transcoder.

2. The method of claim 1, wherein the step of receiving the request for the communication service that supports both voice and data communication comprises the step of receiving a request from the communication unit for a communication service that supports alternate voice and data communication.

3. The method of claim 2, wherein the communication service that supports alternate voice and data communication comprises a Global System for Mobile communications (GSM) alternate speech and data service.

4. The method of claim 2, further comprising the steps of:

receiving, by a switching center, an indication to switch between the data path and the voice path; and switching, by the switching center, between the data path and the voice path in response to the indication to switch.

5. The method of claim 4, wherein the indication to switch between the data path and the voice path is originated by the communication unit.

6. The method of claim 5, wherein the indication to switch between the data path and the voice path comprises a call hold request.

7. A method for a communication infrastructure to facilitate distributed speech processing, the method comprising the steps of:

receiving a request from a communication unit for a communication service that supports both voice and data communication;

receiving a call request for a call between the communication unit and a communication device;

establishing a voice path between the communication unit and the communication device using a wireless communication resource; and establishing a data path between the communication unit and a distributed speech processing unit using the wireless communication resource, wherein the step of establishing the data path between the communication unit and the distributed speech processing unit further comprises the step of routing, by a switching center, data communication between the communication unit and the distributed speech processing unit via a data transcoder.

8. A method for a communication infrastructure to facilitate distributed speech processing, the method comprising the steps of:

receiving a request from a communication unit for a communication service that supports both voice and data communication;

receiving a call request for a call between the communication unit and a communication device;

establishing a voice path between the communication unit and the communication device using a wireless communication resource; and establishing a data path between the communication unit and a distributed speech processing unit using the wireless communication resource, wherein the step of receiving the request for the communication service that supports both voice and data communication comprises the step of receiving a request from the communication unit for a communication service that supports alternate voice and data communication and wherein the step of establishing the data path comprises the step of establishing, by a transcoder, the data path between the communication unit and the distributed speech processing unit.

9. The method of claim 8, further comprising the steps of:

receiving, by the transcoder, an indication to switch between the data path and the voice path; and switching, by the transcoder, between the data path and the voice path in response to the indication to switch.

10. The method of claim 9, wherein the indication to switch between the data path and the voice path is originated by the communication unit.

11. A method for a communication infrastructure to facilitate distributed speech processing, the method comprising the steps of:
- receiving a request from a communication unit for a communication service that supports both voice and data communication;
- receiving a call request for a call between the communication unit and a communication device;
- establishing a voice path between the communication unit and the communication device using a wireless communication resource; and
- establishing a data path between the communication unit and a distributed speech processing unit using the wireless communication resource, wherein the step of establishing the data path comprises the step of establishing, by a transcoder, the data path between the communication unit and the distributed speech processing unit.

12. The method of claim 11, wherein the data path comprises a first portion of the wireless communication resource and the voice path comprises a second portion of the wireless communication resource.

13. The method of claim 12, further comprising the step of routing, by the transcoder, data communication between the communication unit and the distributed speech processing unit via the first portion of the wireless communication resource.

14. The method of claim 12, further comprising the step of routing, by the transcoder, voice communication between the communication unit and the communication device via the second portion of the wireless communication resource.

15. The method of claim 12, wherein the wireless communication resource comprises two time division multiplexed (TDM) time slots, a first time slot and a second time slot, and wherein the first portion of the wireless communication resource comprises the first time slot and the second portion comprises the second time slot.

16. A method for a communication infrastructure to facilitate distributed speech processing, the method comprising the steps of:
- receiving a request from a communication unit to call a distributed speech processing unit;
- receiving a request from the communication unit for a communication service that supports alternate voice and data communication;
- establishing a voice path between the communication unit and the distributed speech processing unit using a wireless communication resource; and
- establishing a data path between the communication unit and the distributed speech processing unit using the wireless communication resource, wherein the step of establishing the voice path between the communication unit and the distributed speech processing unit further comprises the step of routing, by the switching center, voice communication between the communication unit and the distributed speech processing unit via a voice transcoder.

17. The method of claim 16, further comprising the steps of:
- receiving, by the distributed speech processing unit, speech processing data from the communication unit via the data path;
- receiving, by the distributed speech processing unit, voice communication from the communication unit via the voice path; and
- differentiating, by the distributed speech processing unit, between the voice communication and the data communication.

18. The method of claim 16, further comprising the steps of:
- receiving, by the switching center, an indication to switch between the data path and the voice path; and
- switching, by the switching center, between the data path and the voice path in response to the indication to switch.

19. The method of claim 18, wherein the indication to switch between the data path and the voice path is originated by the communication unit.

20. A method for a communication infrastructure to facilitate distributed speech processing, the method comprising the steps of
- receiving a request from a communication unit to call a distributed speech processing unit;
- receiving a request from the communication unit for a communication service that supports alternate voice and data communication;
- establishing a voice path between the communication unit and the distributed speech processing unit using a wireless communication resource; and
- establishing a data path between the communication unit and the distributed speech processing unit using the wireless communication resource, wherein the step of establishing the data path between the communication unit and the distributed speech processing unit further comprises the step of routing, by a switching center, data communication between the communication unit and the distributed speech processing unit via a data transcoder.

21. A wireless communication infrastructure comprising:
- infrastructure equipment that receives a request from a communication unit for a communication service that supports both voice and data communication, receives a call request for a call between the communication unit and a communication device, establishes a voice path between the communication unit and the communication device using a wireless communication resource, and establishes a data path between the communication unit and a distributed speech processing unit using the wireless communication resource, wherein the infrastructure equipment comprises a voice transcoder and a switching center that routes voice communication between the communication unit and the communication device via the voice transcoder.

* * * * *